(12) United States Patent
Moje et al.

(10) Patent No.: US 9,522,735 B2
(45) Date of Patent: Dec. 20, 2016

(54) AIRCRAFT AREA COMPRISING A LUGGAGE COMPARTMENT

(71) Applicant: Airbus Operations GmbH, Hamburg (DE)

(72) Inventors: Sabrina Moje, Hamburg (DE); Matthias Breuer, Hamburg (DE); Paul Vine, Hamburg (DE); Uwe Schneider, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 71 days.

(21) Appl. No.: 14/567,330

(22) Filed: Dec. 11, 2014

(65) Prior Publication Data

US 2015/0166179 A1 Jun. 18, 2015

(30) Foreign Application Priority Data

Dec. 11, 2013 (DE) .......................... 10 2013 021 449

(51) Int. Cl.
*B64D 11/00* (2006.01)

(52) U.S. Cl.
CPC ............. *B64D 11/003* (2013.01); *B64D 11/00* (2013.01)

(58) Field of Classification Search
CPC ............................. B64D 11/003; B64D 11/00
See application file for complete search history.

(56) References Cited

U.S. PATENT DOCUMENTS

| 3,386,765 A | 6/1968 | Drach, Jr. | |
| 4,678,226 A | 7/1987 | Ishizuka et al. | |
| 4,951,560 A | 8/1990 | Setan | |
| 5,687,929 A | 11/1997 | Hart et al. | |
| 5,820,076 A * | 10/1998 | Schumacher | ........ B64D 11/003 244/118.5 |
| 5,842,668 A * | 12/1998 | Spencer | ............... B64D 11/003 244/118.1 |
| 5,868,353 A * | 2/1999 | Benard | ................ B64D 11/003 244/118.1 |

(Continued)

FOREIGN PATENT DOCUMENTS

| DE | 19540929 | 5/1997 |
| DE | 102007030331 | 1/2009 |

(Continued)

OTHER PUBLICATIONS

German Search Report, Aug. 13, 2014.

*Primary Examiner* — Justin Benedik
(74) *Attorney, Agent, or Firm* — Greer, Burns & Crain Ltd.

(57) ABSTRACT

An aircraft area comprises a first rib forming a component of an aircraft primary structure and extending in an arc shape along an outer contour of the aircraft area. A second rib is arranged at a distance from the first rib and parallel to the first rib, also forms a component of the aircraft primary structure and extends in an arc shape along the outer contour of the aircraft area. A luggage compartment is arranged between the first and the second rib such that a portion of a first side face of the luggage compartment that faces the first rib is arranged opposite a side face of the first rib that faces the luggage compartment, and/or that a portion of a second side face of the luggage compartment that faces the second rib is arranged opposite a side face of the second rib that faces the luggage compartment.

21 Claims, 12 Drawing Sheets

(56) References Cited

U.S. PATENT DOCUMENTS

| | | | | |
|---|---|---|---|---|
| 6,056,239 A * | 5/2000 | Cantu | ............... | B64D 11/06 244/118.5 |
| 6,062,509 A * | 5/2000 | Burrows | ............ | B64D 11/003 244/118.5 |
| 6,536,710 B1 * | 3/2003 | Bobzien | ............. | B64C 1/066 244/119 |
| 6,886,781 B2 * | 5/2005 | Lau | ............... | B64D 11/003 244/118.1 |
| 7,380,752 B2 * | 6/2008 | Guard | ............... | B64C 1/066 244/118.5 |
| 8,480,027 B2 * | 7/2013 | Helfrich | ............... | 244/118.5 |
| 2002/0020652 A1 | 2/2002 | Martinez | | |
| 2003/0019976 A1 * | 1/2003 | Cheung | ............ | B64D 11/0604 244/118.5 |
| 2007/0284479 A1 * | 12/2007 | Pein | ............... | B64D 11/003 244/118.2 |
| 2008/0078871 A1 * | 4/2008 | Munson | ............ | B64D 11/003 244/118.5 |
| 2008/0283664 A1 | 11/2008 | Calamvokis | | |
| 2009/0050738 A1 * | 2/2009 | Breuer | ............... | B64D 11/02 244/118.5 |
| 2009/0230244 A1 * | 9/2009 | Kofinger | ............ | B64C 1/066 244/118.5 |
| 2010/0044509 A1 * | 2/2010 | Helfrich | ............ | B64D 11/003 244/118.5 |
| 2011/0278395 A1 | 11/2011 | Telgkamp et al. | | |
| 2015/0069182 A1 | 3/2015 | Jacobsen et al. | | |

FOREIGN PATENT DOCUMENTS

| | | |
|---|---|---|
| DE | 102008006949 | 8/2009 |
| DE | 102008039637 | 3/2010 |
| DE | 102009029120 | 3/2011 |
| DE | 102010042970 | 11/2011 |
| DE | 102012009632 | 11/2013 |
| EP | 0919431 | 6/1999 |

* cited by examiner

AIRCRAFT AREA COMPRISING A LUGGAGE COMPARTMENT

CROSS-REFERENCES TO RELATED APPLICATIONS

This application claims the benefit of the German patent application No. 10 2013 021 449.1 filed on Dec. 11, 2013, the entire disclosures of which are incorporated herein by way of reference.

BACKGROUND OF THE INVENTION

The invention relates to an aircraft area, formed in particular by an area of an aircraft cabin, in which a luggage compartment is arranged.

In a passenger cabin of a modern commercial aircraft, a plurality of overhead luggage compartments are provided that are installed above the rows of passenger seats, along a longitudinal axis of the passenger cabin. Usually, the luggage compartments are mounted such that there is sufficient space, between a rear side of the luggage compartments that is remote from an interior of the passenger cabin and a primary structure or an insulation of the aircraft, to enable the installation of air lines, which connect air lines that are arranged in a PSU duct above and below the luggage compartments to the aircraft air conditioning system. Thus, the rear side of the luggage compartments is typically arranged at a distance, which is determined by the requirements of the installation space of the air lines and other components that are to be mounted in the area of the rear sides of the luggage compartments, from the elements, in particular the ribs of the aircraft primary structure.

SUMMARY OF THE INVENTION

An object of the invention is to provide an aircraft area in which a luggage compartment is arranged and which is designed such that particularly efficient utilization of the space available in an aircraft passenger cabin is made possible.

An aircraft area includes a first rib which forms a component of an aircraft primary structure and extends in the shape of an arc along an outer contour of the aircraft area. A second rib is arranged at a distance from the first rib and parallel to the first rib which also forms a component of the aircraft primary structure and extends in the shape of an arc along the outer contour of the aircraft area. The term "primary structure" here is understood to mean the supporting main structure of an aircraft, which defines the contour of the aircraft fuselage and includes as essential elements a plurality of ribs arranged substantially mutually parallel and a plurality of stringers which extend between the ribs and substantially parallel to a longitudinal axis of the aircraft. The term "outer contour of the aircraft area" here is understood to mean an external, that is to say, remote from the interior of the aircraft area, delimitation of the aircraft area which may be defined, for example, by an aircraft outer skin which may be connected to the primary structure of the aircraft in a manner that transmits load.

The aircraft area further includes a luggage compartment which is arranged between the first and the second rib such that a portion of a first side face of the luggage compartment that faces the first rib is arranged opposite a side face of the first rib that faces the luggage compartment, and/or in that a portion of a second side face of the luggage compartment that faces the second rib is arranged opposite a side face of the second rib that faces the luggage compartment. Consequently, the luggage compartment is positioned in the aircraft area such that it is no longer arranged at a distance from an inner face of the ribs that faces the interior of the aircraft area but, rather, projects into the shadow area created by the ribs.

By positioning the luggage compartment such that it projects into the shadow area created by the ribs, the installation space present between the ribs can be utilized as additional installation space for the luggage compartment. In this way, the luggage compartment may selectively have, by comparison with conventional luggage compartments, a greater depth in the direction of the outer contour of the aircraft area and consequently accommodate more luggage, or be set further in the direction of the outer contour of the aircraft area. In the latter case, the luggage compartment then no longer extends as far as a main gangway running along the longitudinal axis of the aircraft area but, rather, is readily accessible to persons standing between the rows of passenger seats, to the side of the main gangway. This may prevent persons having to stand in the main gangway of the aircraft area to load or unload the luggage compartment. Consequently, with an aircraft equipped with the aircraft area, the boarding and disembarking cycles may be shortened.

In a preferred embodiment of the aircraft area, the portion of the first side face of the luggage compartment which is arranged opposite the side face of the first rib that faces the luggage compartment extends substantially parallel to the side face of the first rib that faces the luggage compartment. In addition or as an alternative to this, the portion of the second side face of the luggage compartment that is arranged opposite the side face of the second rib that faces the luggage compartment may extend substantially parallel to the side face of the second rib that faces the luggage compartment. In that case, the luggage compartment may be mounted between the ribs in the aircraft area in a manner that is particularly saving on installation space.

A portion of the first side face of the luggage compartment that faces the first rib may project in the direction of the outer contour of the aircraft area, beyond the side face of the first rib that faces the luggage compartment. Similarly, a portion of the second side face of the luggage compartment that faces the second rib may project in the direction of the outer contour of the aircraft area, beyond the side face of the second rib that faces the luggage compartment. In this case, the luggage compartment may be installed between the ribs in a manner that is particularly saving on installation space, and moreover is particularly well suited to accommodating angled standard items of baggage such as standard wheeled suitcases that are permitted as hand baggage on board an aircraft.

Preferably, a rear side of the luggage compartment has a shape adapted to the outer contour of the aircraft area. For example, the rear side of the luggage compartment may have a curved shape that is adapted to the curved outer contour of the aircraft area. Preferably, however, the rear side of the luggage compartment is only adapted to the outer contour of the aircraft area in certain regions in order to optimize the shape of the luggage compartment for accommodating angled standard items of baggage.

In particular, the rear side of the luggage compartment may have a first and a second portion, wherein the first portion may extend preferably substantially perpendicular to a lower side of the luggage compartment that faces a floor region of the aircraft area. In the event that an upper side of the luggage compartment that faces a ceiling region of an aircraft area extends substantially parallel to the lower side of the luggage compartment, the rear side of the luggage compartment preferably also extends substantially perpendicular to the upper side of the luggage compartment. Further, the second portion of the rear side of the luggage compartment may be inclined at an angle of 120 to 160°, preferably at an angle of 130 to 150°, particularly preferably at an angle of 140 to 150°, and in particular preferably at an angle of approximately 145° relative to the first portion. The second portion of the rear side of the luggage compartment preferably adjoins portions of the side faces of the luggage compartment that project out of the shadow area created by the ribs, in the direction of the outer contour of the aircraft area. As a result of the inclined contour of the second portion of the luggage compartment rear side, the luggage compartment may be arranged particularly close to the outer contour of the aircraft area, that is to say, for example, to the aircraft outer skin or to an insulation element that extends at least in certain regions along the outer contour of the aircraft area.

The first and second portions of the luggage compartment rear side may be connected to one another by a transitional portion that is inclined relative to the first portion at an angle of 140 to 170°, preferably at an angle of 150 to 160° and in particular preferably at an angle of approximately 155°. Preferably, at least one of an edge that connects the second portion of the luggage compartment rear side to the upper side of the luggage compartment, an edge that connects the second portion of the luggage compartment rear side to the transitional portion of the luggage compartment rear side, an edge that connects the transitional portion of the luggage compartment rear side to the first portion of the luggage compartment rear side, and an edge that connects the first portion of the luggage compartment rear side to the lower side of the luggage compartment is shaped to be rounded in order to prevent damage to components, for example, insulation elements, that are built into the aircraft area in the region of the luggage compartment rear side.

In a preferred embodiment of the aircraft area, the luggage compartment is positioned such that the lower side of the luggage compartment is inclined at an angle of 4 to 15°, preferably at an angle of 5 to 10°, particularly preferably at an angle of 6 to 8° and in particular preferably at an angle of approximately 7° relative to a floor of the aircraft area, in the direction of the outer contour of the aircraft area. If the upper side is oriented parallel to the lower side of the luggage compartment, then preferably the upper side of the luggage compartment is also inclined at an angle of 4 to 15°, preferably at an angle of 5 to 10°, particularly preferably at an angle of 6 to 8° and in particular preferably at an angle of approximately 7° relative to the floor of the aircraft area, in the direction of the outer contour of the aircraft area.

The inclined arrangement of the luggage compartment produces more headroom for passengers sitting in passenger seats situated below the luggage compartment. Moreover, the luggage compartment may in that case be brought closer to the outer contour of the aircraft area without sacrificing volume, that is to say, the upper side of the luggage compartment may be brought even closer to the outer contour of the aircraft area, as a result of which in particular in the ceiling region of the aircraft area an impression of generous space is produced. Moreover, by inclining the luggage compartment relative to the floor of the aircraft area in the direction of the outer contour of the aircraft area, it is possible to prevent baggage that is stowed in the luggage compartment from falling out when the luggage compartment is opened.

In a preferred embodiment of the aircraft area, the luggage compartment includes a hinged flap which is pivotal between a closed position and an open position and through which the luggage compartment is made accessible for loading and unloading. Preferably, as seen from the interior of the aircraft area and looking in the direction of view of the outer contour of the aircraft area, the hinged flap has a convex or concave curvature. In other words, the hinged flap may have a curvature opposed to the curvature of the outer contour of the aircraft area or may be curved in the same direction as the outer contour. This manner of shaping the hinged flap intensifies the visual impression of a generous amount of space in the ceiling region of the aircraft area. With a concave curvature, the impression of space is even greater.

Preferably, the luggage compartment is a luggage compartment whereof the lower side is rigidly connected to the side walls and the rear wall. A luggage compartment of this kind is called a fixed bin and is relatively simple to manufacture and mount. Moreover, a luggage compartment which takes the form of a fixed bin has only a small number of moving parts, namely only the hinged flap that pivots between a closed position and an open position, and is thus relatively low-maintenance. If desired, however, the aircraft area may also be equipped with a luggage compartment that has a lower shell that is pivotal between an open position and a closed position, relative to the side walls of the luggage compartment. A luggage compartment of this kind, also called a movable bin, can bring the pivotal lower shell down relative to the side walls of the luggage compartment, in the direction of the floor of the aircraft area, such that baggage can be laid in the shell and removed from the shell. A luggage compartment having a movable lower shell may be adapted to the outer contour of the aircraft area particularly well, but because of its large number of moving parts is relatively high-maintenance and more expensive to manufacture and mount than a luggage compartment which takes the form of a fixed bin. If desired, a luggage compartment which takes the form of a movable bin may have a front side that faces the interior of the aircraft area and which, as seen from the interior of the aircraft area and looking in the direction of view of the outer contour of the aircraft area, has a convex or concave curvature.

In the aircraft area, at least one of the distance between the first and the second rib, a maximum dimension of the luggage compartment along the longitudinal axis of the aircraft area, a maximum dimension of the luggage compartment between the upper side and the lower side of the luggage compartment, and a maximum dimension of the luggage compartment between the rear side and the pivotal hinged flap of the luggage compartment may be selected such that a desired number of standard items of baggage may be accommodated in a desired orientation inside the luggage compartment. For example, the distance between the ribs and the dimensions of the luggage compartment may be selected such that there is space in the luggage compartment for two standard wheeled suitcases that are permitted as hand baggage on board an aircraft, upright or laid flat next to one another.

The portion of the first side face of the luggage compartment that is arranged opposite the side face of the first rib may abut against a first primary insulation element that at least partly encases the first rib. Similarly, the portion of the second side face of the luggage compartment that is arranged opposite the side face of the second rib may abut against a second primary insulation element that at least partly encases the second rib. The installation space that is available for the luggage compartment between the ribs may in that case be utilized particularly efficiently. Moreover, the region between two luggage compartments that are adjacent to one another in the direction of the longitudinal axis of the aircraft area, and whereof the dimension in the direction of the longitudinal axis of the aircraft area is defined by the dimensions of the rib that is positioned between the luggage compartments and where appropriate a primary insulation element that at least partly encases the rib, may be utilized as installation space for components that are to be built into the aircraft area. Examples of these components are electrical or electronic components, components of an aircraft air conditioning system such as air lines that convey air, electrical lines or water-conveying lines.

The rear side of the luggage compartment, in particular the second portion of the rear side of the luggage compartment, may abut against a third primary insulation element. The third primary insulation element may extend at least in certain regions along the outer contour of the aircraft area, that is to say, may, for example, have a curvature that is adapted to the outer skin of the aircraft, and be secured to a stringer that extends substantially parallel to the longitudinal axis of the aircraft area between the first and the second rib. In contrast to this, the first portion of the luggage compartment rear side, the transitional portion of the luggage compartment rear side and/or the luggage compartment upper side may be arranged at a distance from the third primary insulation element. The region between the first portion and the transition region of the luggage compartment rear side and the third primary insulation element may in that case, like the region between the upper side of the luggage compartment and the third primary insulation element, advantageously be utilized as installation space for components to be mounted in the aircraft area.

In an alternative embodiment of the aircraft area, the first side face of the luggage compartment is formed integral with the first rib. Similarly, the second side face of the luggage compartment may be formed integral with the second rib. Mechanical loads that are introduced into the luggage compartment may then be transmitted directly to the primary structure of the aircraft, as a result of which the luggage compartment may be made particularly stable in form. Moreover, the number of components to be built into the aircraft area may be reduced.

For example, the first side face of the luggage compartment may be formed by a region of the first rib that is widened in the direction of the interior of the aircraft area. Similarly, the second side face of the luggage compartment may be formed by a region of the second rib that is widened in the direction of an interior of the aircraft area. An integrated design of at least one side face of the aircraft luggage compartment with a rib of the aircraft primary structure is particularly useful if the primary structure of the aircraft is made from a composite material, in particular a fiber-reinforced composite material.

The aircraft area may further include at least one additional luggage compartment which may be arranged adjacent to at least one of the upper side and the lower side of the luggage compartment. If desired, the additional luggage compartment may be secured to the luggage compartment in the region of at least one of the upper side and the lower side of the luggage compartment. For example, a first additional luggage compartment which serves to accommodate small articles may be secured to the lower side of the luggage compartment. In addition or as an alternative to this, a second additional luggage compartment which also serves to accommodate small articles may be secured to the upper side of the luggage compartment. The additional luggage compartments may, for example, be utilized to accommodate articles of clothing, consequently preventing the articles of clothing from being squashed or even damaged by items of baggage such as wheeled suitcases that are stowed in the luggage compartment.

However, the at least one additional luggage compartment may take not only the form of an additional stowage space for accommodating articles of small volume. Rather, it is also conceivable to provide, adjacent to at least one of the upper side and the lower side of the luggage compartment, an additional luggage compartment that has all or at least some of the features of the luggage compartment that are described above.

In one embodiment, the additional luggage compartment may comprise a shell that is pivotable relative to the luggage compartment between a closed position and an open position about a pivot axis. In case the additional luggage compartment is arranged adjacent to the lower side of the luggage compartment the shell of the additional luggage compartment may be lowered relative to the luggage compartment in order to open the additional luggage compartment so as to make its interior accessible. The access to the additional luggage compartment for a person standing in an aisle adjacent to the additional luggage compartment then is particularly comfortable.

The pivot axis about which the shell of the additional luggage compartment may be pivotable relative to the luggage compartment may extend substantially parallel to the longitudinal axis of the aircraft area. A front edge of the additional luggage compartment which faces, for example, an aisle of the aircraft area then extends substantially parallel to a corresponding front edge of the luggage compartment. It is, however, also conceivable to design the additional luggage compartment such that its shell is pivotable relative to the luggage compartment about a pivot axis which extends substantially perpendicular to the longitudinal axis of the aircraft area. The additional luggage compartment then may be integrated in a PSU channel arranged above rows of passenger seats or may be positioned beside the PSU channel above the rows of passenger seats. The additional luggage compartment then is easily accessible to passengers sitting on the passenger seats and may, for example, be used to store small items such as sun glasses or the like.

An access opening of the additional luggage compartment may be covered by a mesh. The mesh prevents items received within the additional luggage compartment from falling out of the additional luggage compartment when the additional luggage compartment is opened, but still is transparent enough to allow a user seeing the interior of the additional luggage compartment. As a result, items placed in the additional luggage compartment can easily be identified, which may help shortening disembarking cycles of the aircraft.

The luggage compartment and the at least one additional luggage compartment may each have a separate hinged flap that is pivotal between a closed position and an open position and through which the luggage compartment and the additional luggage compartment may be made accessible. Preferably, however, the luggage compartment and the additional luggage compartment have a common hinged flap that is pivotal between a closed position and an open position. With an embodiment of this kind of the luggage compartment and the additional luggage compartment, only one hinged flap needs to be opened to make both the luggage compartment and the additional luggage compartment accessible. Moreover, the number of moving and hence high-maintenance components is minimized.

In a further embodiment, an access opening of the additional luggage compartment may be formed in the lower side of the luggage compartment that faces a floor region of the aircraft area. The additional luggage compartment then is accessible via an interior of the luggage compartment and may be used to receive components to be mounted in the overhead region of the aircraft region such as, for example, PSU components or system interfaces. The access opening preferably is covered by a detachable cover. The detachable cover protects components mounted within the additional luggage compartment from external influences, in particular influences occurring in use of the luggage compartment, but still allows easy access to the components, if needed, for example, for maintenance purposes.

BRIEF DESCRIPTION OF THE DRAWINGS

Preferred embodiments of the invention will now be explained in more detail with reference to the attached schematic drawings, in which.

DETAILED DESCRIPTION OF THE PREFERRED EMBODIMENTS

Figure 1:
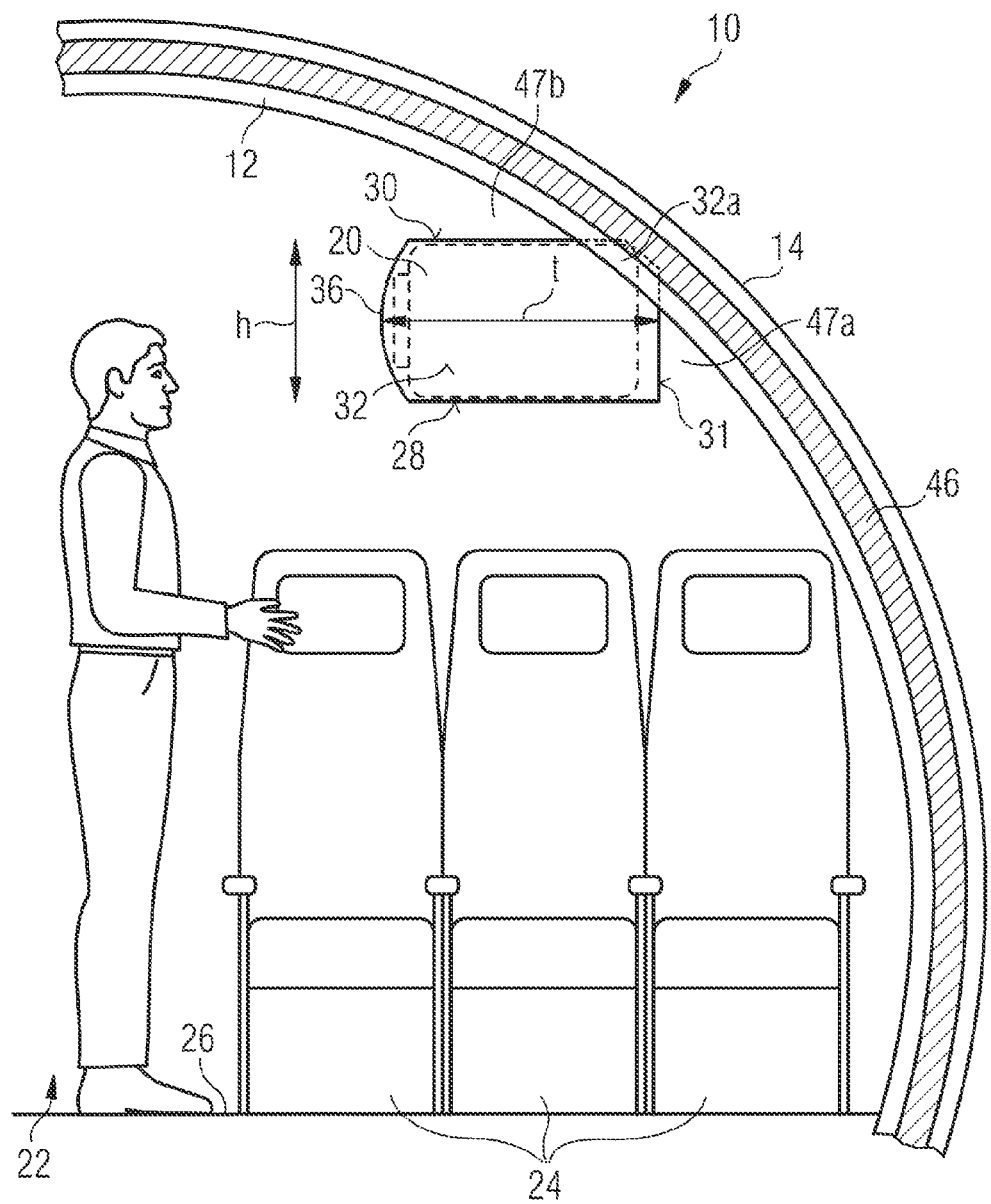
FIG. 1 shows an aircraft area that is formed by a portion of an aircraft passenger cabin, in a cross section perpendicular to a floor of the aircraft area.
Figure 2:
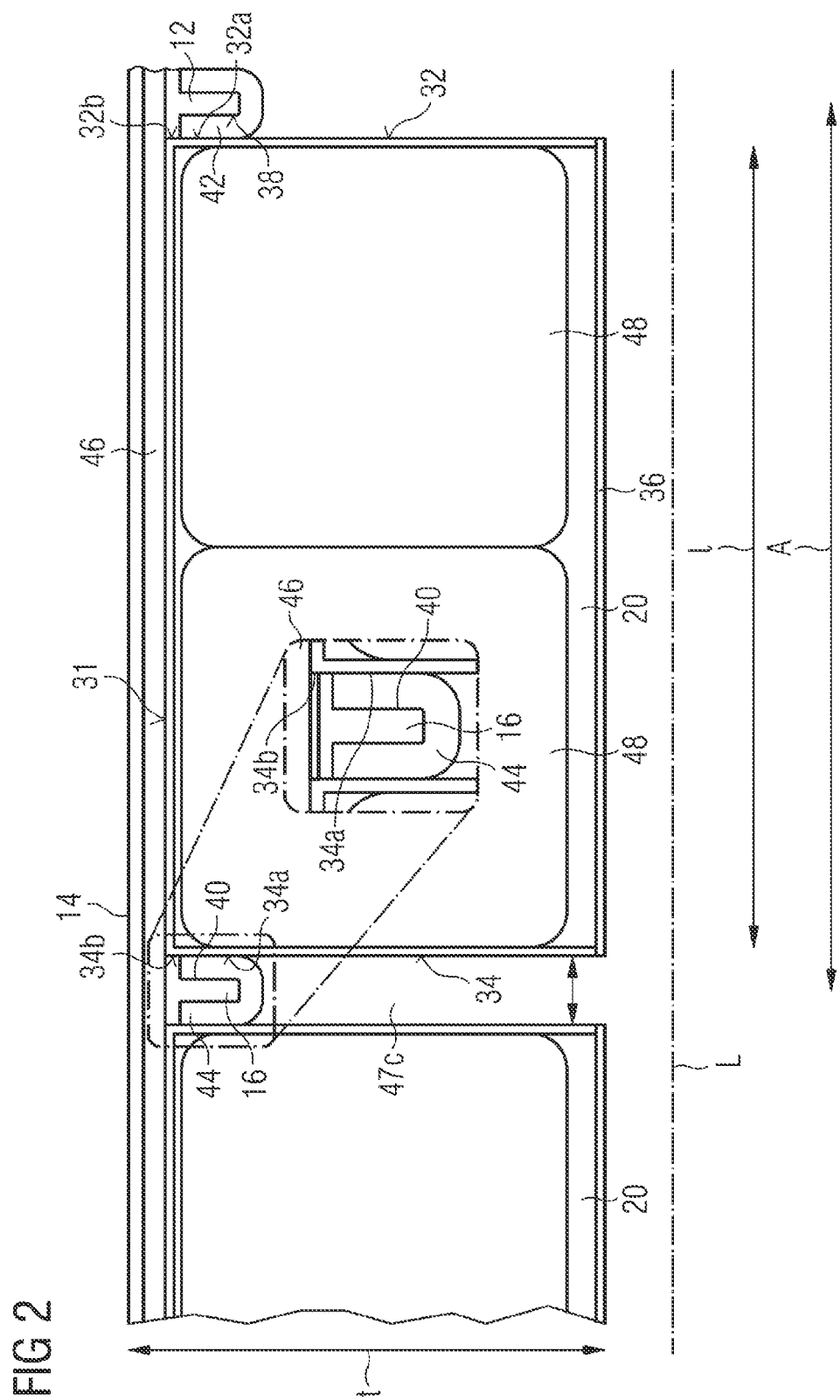
FIG. 2 shows a detail illustration of the aircraft area according to FIG. 1, in a cross sectional view parallel to the floor of the aircraft area.

An aircraft area 10 illustrated in FIGS. 1 and 2 includes a first rib 12, which forms a component of an aircraft primary structure and extends in the shape of an arc along an outer contour of the aircraft area 10, this outer contour being defined by an outer skin 14 of the aircraft. Further, a second rib 16 is provided in the aircraft area 10; see FIG. 2. The second rib 16 is arranged at a distance A from the first rib 12 and extends parallel to the first rib 12 in the shape of an arc along the outer contour of the aircraft area 10 that is defined by the outer skin 14. The second rib 16 also forms a component of the primary structure of the aircraft, which includes further ribs (not shown in the figures) and a plurality of stringers 18 which extend between the ribs 12, 16 parallel to a longitudinal axis L of the aircraft area 10 and hence also parallel to a longitudinal axis of the aircraft; see FIG. 3.

A luggage compartment 20 is installed in the aircraft area 10. In particular, the luggage compartment 20 is arranged above passenger seats 24 that are installed in the aircraft area 10, offset in the direction of the outer contour of the aircraft area 10 from a main gangway 22 provided in the aircraft area 10. The luggage compartment 20 includes a lower side 28, which faces a floor region, that is to say, a floor 26 of the aircraft area 10, and an upper side 30 that faces a ceiling region of the aircraft area 10. In the exemplary embodiment of an aircraft area 10 that is illustrated in the figures, the lower side 28 and the upper side 30 of the luggage compartment 20 extend substantially parallel to one another. Further, the luggage compartment 20 includes a rear side 31 which faces the outer contour of the aircraft area 10, that is to say, the aircraft outer skin 14. Finally, the luggage compartment 20 includes a first side face 32 that faces the first rib 12 and a second side face 34 that faces the second rib 16.

Figure 3:
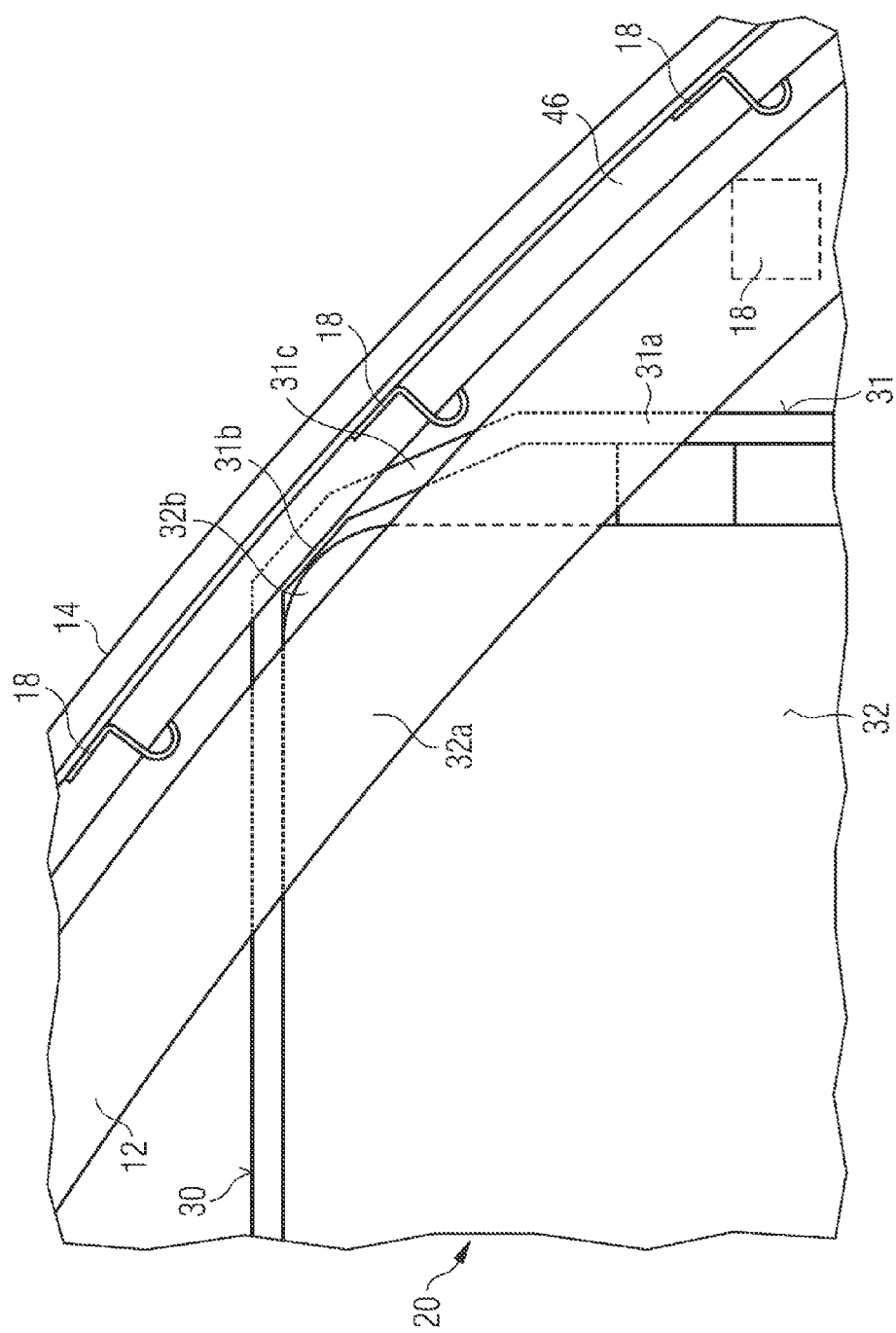
FIG. 3 shows a detail illustration of a luggage compartment that is built into the aircraft area according to FIG. 1, FIGS. 4a to 4d show different variants on a luggage compartment that is built into the aircraft area according to FIG. 1.

The luggage compartment 20 is mounted rigidly in the aircraft area 10. For example, the luggage compartment 20 may be connected by means of suitable securing elements to the primary structure, in particular the ribs 12, 16. The luggage compartment 20 further has a hinged flap 36 that is pivotal between a closed position and an open position. FIGS. 1 to 3 show the hinged flap 36 in its closed position. However, it is also pivotal in the direction of the ceiling region of the aircraft area 10 relative to the lower side 28, the upper side 30 and the side faces 32, 34 of the luggage compartment 20 in order to make the luggage compartment 20 accessible for loading it with baggage and for unloading baggage from the luggage compartment 20.

As can best be seen in FIG. 2, the luggage compartment 20 is arranged between the first and the second rib 12, 16 such that a portion 32a of the first side face 32 of the luggage compartment 20, which faces the first rib 12, is arranged opposite a side face 38 of the first rib 12 which faces the luggage compartment 20. Similarly, a portion 34a of the second side face 34 of the luggage compartment 20 which faces the second rib 16 is arranged opposite a side face 40 of the second rib 16 which faces the luggage compartment 20. In particular, the portion 32a of the first side face 32 of the luggage compartment 20 which is arranged opposite the side face 38 of the first rib 12 that faces the luggage compartment 20 extends substantially parallel to the side face 38 of the first rib 12 that faces the luggage compartment 20. Similarly, the portion 34a of the second side face 34 of the luggage compartment 20 which is arranged opposite the side face 40 of the second rib 16 that faces the luggage compartment 20 extends substantially parallel to the side face 40 of the second rib 16 that faces the luggage compartment 20.

The region of the luggage compartment 20 which is delimited in the direction of the longitudinal axis L of the aircraft area 10 by the portions 32a, 34a of the side faces 32, 34 of the luggage compartment 20 thus is positioned in the shadow area that is defined by the two ribs 12, 16. Consequently, the luggage compartment 20 may be arranged in a position that is displaced further in the direction of the outer contour of the aircraft area 10 than conventional luggage compartments. As a result, the luggage compartment 20 is also accessible to a person standing in a region between the rows of passenger seats 20, offset from the main gangway 22. Moreover, the impression of a generous provision of space is created in the ceiling region of the aircraft area 10, which is intensified by the fact that the hinged flap 36 of the luggage compartment 20 has a convex curvature, as seen from the interior of the aircraft area in the direction of view of the outer contour of the aircraft area 10.

As can be seen in particular from FIGS. 2 and 3, the luggage compartment 20 is even positioned far enough in the direction of the outer contour of the aircraft area 10 for a portion 32b of the first side face 32 of the luggage compartment 20 that faces the first rib 12 to project in the direction of the outer contour of the aircraft area 10, beyond the first side face 38 of the first rib 12 that faces the luggage compartment 20. Similarly, a portion 34b of the second side face 34 of the luggage compartment 20 that faces the second rib 16 projects in the direction of the outer contour of the aircraft area 10, beyond the side face 40 of the second rib 16 that faces the luggage compartment 20. The rear side 31 of the luggage compartment 20 has a shape adapted to the outer contour of the aircraft area 10. A region of the luggage compartment 20 that is delimited by the portions 32b, 34b of the side faces 32, 34 of the luggage compartment 20 is particularly well suited to accommodating a corner of a cuboid standard item of baggage, for example, a standard wheeled suitcase that is permitted as hand baggage in an aircraft cabin.

As can be seen from FIG. 3, the rear side 31 of the luggage compartment 20 has a first portion 31a that extends substantially perpendicular to the lower side 28 and the upper side 30 of the luggage compartment 20. A second portion 31b of the luggage compartment rear side 31 is inclined at an angle of approximately 145° relative to the first portion 31a. The first and the second portion 31a, 31b of the luggage compartment rear side 31 are connected to one another by a transitional portion 31c that is inclined at an angle of approximately 155° relative to the first portion 31a. This shape of the luggage compartment rear side 31 makes it possible to move the luggage compartment 20 particularly close to the outer contour of the aircraft area 10.

In order to make optimum use of the installation space that is available for the luggage compartment 20 between the ribs 12, 16, in the aircraft area 10 as illustrated in FIGS. 1 to 3 the portion 32a of the first side face 32 of the luggage compartment 20 which is arranged opposite the side face 38 of the first rib 12 abuts against a first primary insulation element 42 that partly encases the first rib 12. Similarly, the portion 34a of the second side face 34 of the luggage compartment 20 which is arranged opposite the side face 40 of the second rib 16 abuts against a second primary insulation element 44 that partly encases the second rib 16. Finally, it is particularly clear from FIG. 3 that the second portion 31b of the rear side 31 of the luggage compartment 20 abuts against a third primary insulation element 46, which extends along the outer contour of the aircraft area 10 in the region of an inner side of the aircraft outer skin 14 facing the interior of the aircraft area 10. The third primary insulation element 46 may, for example, be secured to the stringers 18 that extend between the ribs, substantially parallel to the longitudinal axis L of the aircraft area 10.

In contrast to this, the first portion 31a of the luggage compartment rear side 31, the transitional portion 31c of the luggage compartment rear side 31 and the luggage compartment upper side 30 are arranged at a distance from the third primary insulation element 46. A region 47a between the first portion 31a and the transitional portion 31c of the luggage compartment rear side 31 and the third primary insulation element 46 may in that case advantageously be utilized, as can a region 47b between the upper side 30 of the luggage compartment 20 and the third primary insulation element 46, as an installation space for components that are to be mounted in the aircraft area 10, such as electrical or electronic components, components of an aircraft air conditioning system such as lines that convey air, electrical lines or water-conveying lines; see FIG. 1. Moreover, a region 47c between two luggage compartments 20 that are adjacent to one another in the direction of the longitudinal axis L of the aircraft area 10, and whereof the dimension in the direction of the longitudinal axis L of the aircraft area 10 is defined by the sizes of the rib 16 positioned between the luggage compartments 20 and the primary insulation element 44 that partly encases the rib 16, may be utilized as an installation space for components to be built into the aircraft area 10.

As can be seen from FIGS. 4a to 4d, the following are part of the essential design parameters of the aircraft area 10: the distance A between the first and the second rib 12, 16; a maximum dimension 1 of the luggage compartment 20 arranged between the first and the second rib 12, 16 along the longitudinal axis L of the aircraft area 10; a maximum dimension h of the luggage compartment 20 between the lower side 28 and the upper side 30 of the luggage compartment 20; and/or a maximum dimension t of the luggage compartment 20 between the rear side 31 and the pivotal hinged flap 36 of the luggage compartment 20. These design parameters may be varied such that the luggage compartment 20 can accommodate a desired number of standard items of baggage 48, which may, for example, take the form of standard wheeled suitcases permitted as hand baggage on board an aircraft, in a desired number and a desired orientation.

Figure 4A:
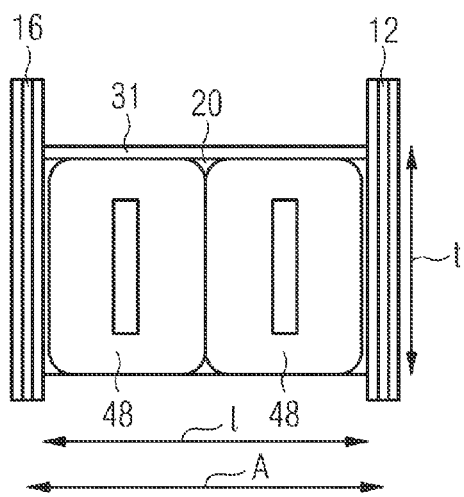
Figure 4B:
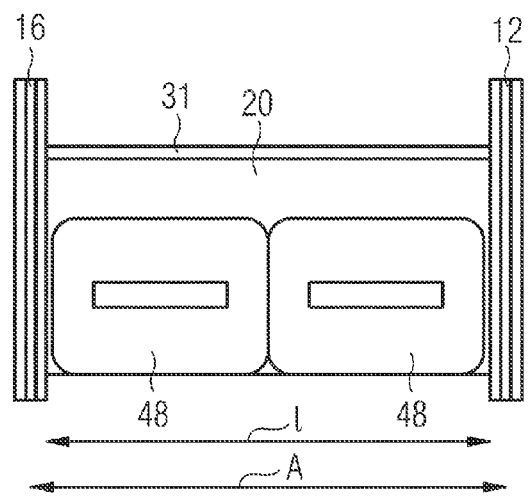
Figure 4C:
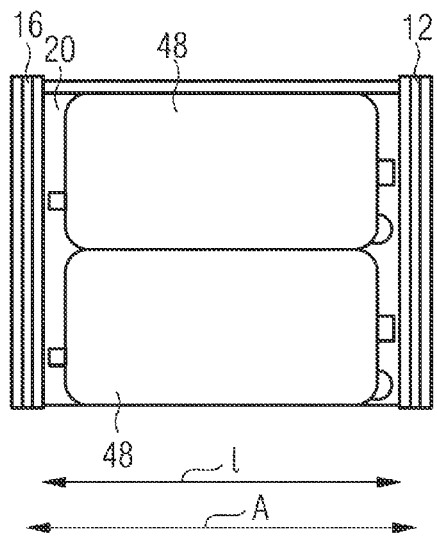
Figure 4D:
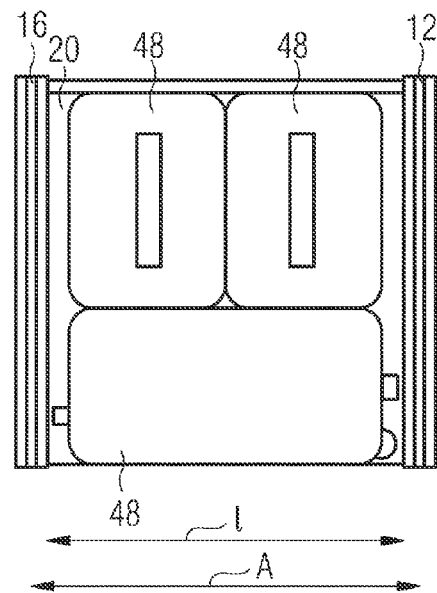

For example, in the case of the luggage compartment 20 illustrated in FIG. 4a, the rib distance A and the dimensions 1, h, t of the luggage compartment 20 are selected such that there is room for two standard items of baggage 48 upright next to one another in the luggage compartment 20. In the arrangement according to FIG. 4b, the rib distance A and the dimensions 1, h, t of the luggage compartment 20 are selected such that two standard items of baggage 48 may be arranged lying flat next to one another in the luggage compartment 20. In the arrangement illustrated in FIG. 4c, the rib distance A and the dimensions 1, h, t of the luggage compartment 20 are selected such that there is room for two standard items of baggage 48 on top of one another in the luggage compartment 20. Finally, the arrangement according to FIG. 4d takes a shape, in respect of the rib distance A and the dimensions 1, h, t of the luggage compartment 20, such that two standard items of baggage 48 may be stowed upright in the luggage compartment 20 above a standard item of baggage 48 lying flat.

Figure 5:
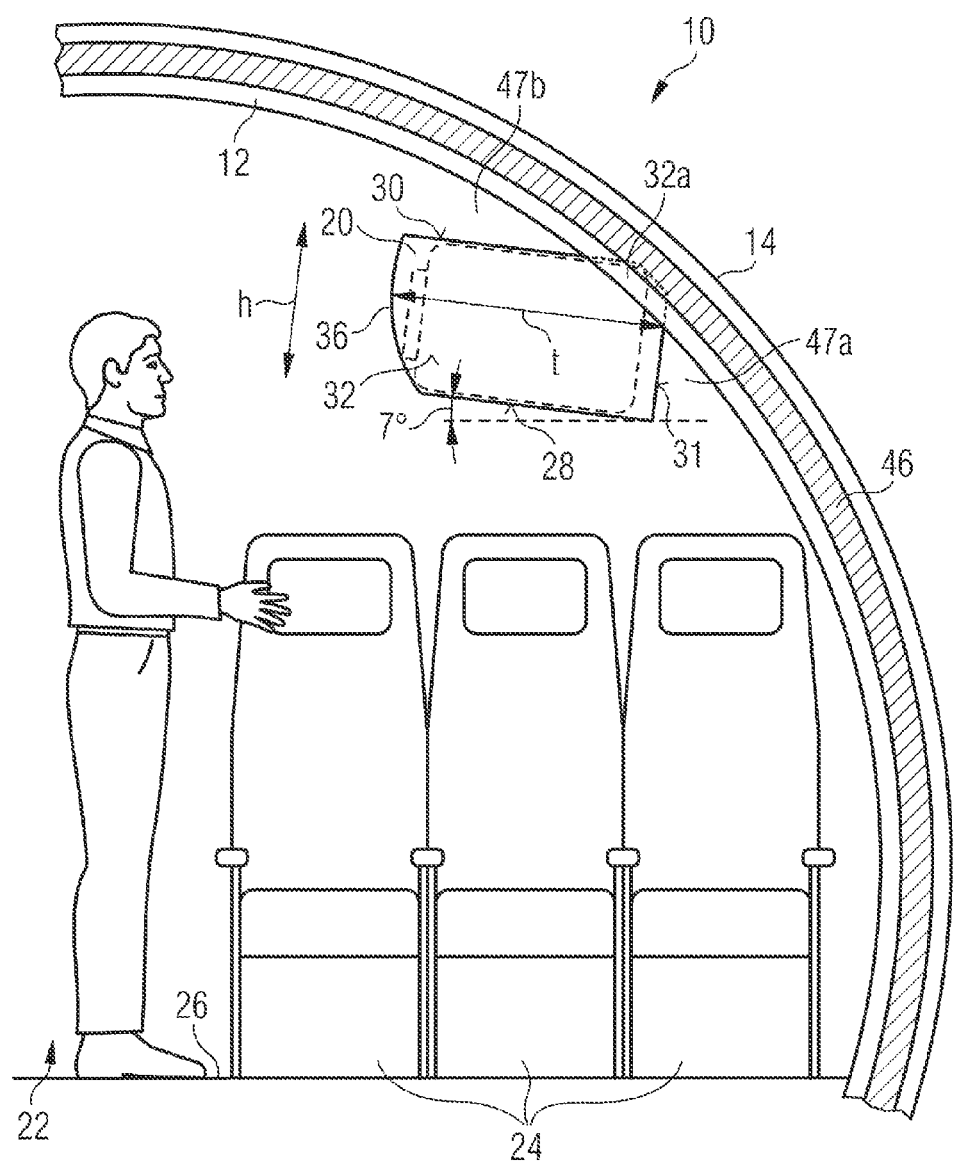
FIG. 5 shows an alternative embodiment of an aircraft area formed by a portion of an aircraft passenger cabin, in a cross sectional view perpendicular to a floor of the aircraft area.

The embodiment of an aircraft area 10 that is shown in FIG. 5 differs from the arrangement according to FIGS. 1 to 3 in that the luggage compartment 20 is positioned such that the lower side 28 and the upper side 30 of the luggage compartment 20 are inclined at an angle of approximately 7° relative to the floor 26 of the aircraft area 10, in the direction of the outer contour of the aircraft area 10. This arrangement of the luggage compartment 20 prevents items of baggage that are arranged in the luggage compartment 20 from falling out when the luggage compartment 20 is opened. Moreover, the inclined arrangement of the luggage compartment 20 increases the headroom for passengers seated on the passenger seats 24, and the visual impression of a generously sized ceiling region in the aircraft area 10 is intensified. Otherwise, the structure of the aircraft area 10 according to FIG. 5 corresponds to the structure of the arrangement illustrated in FIGS. 1 to 3.

Figure 6:
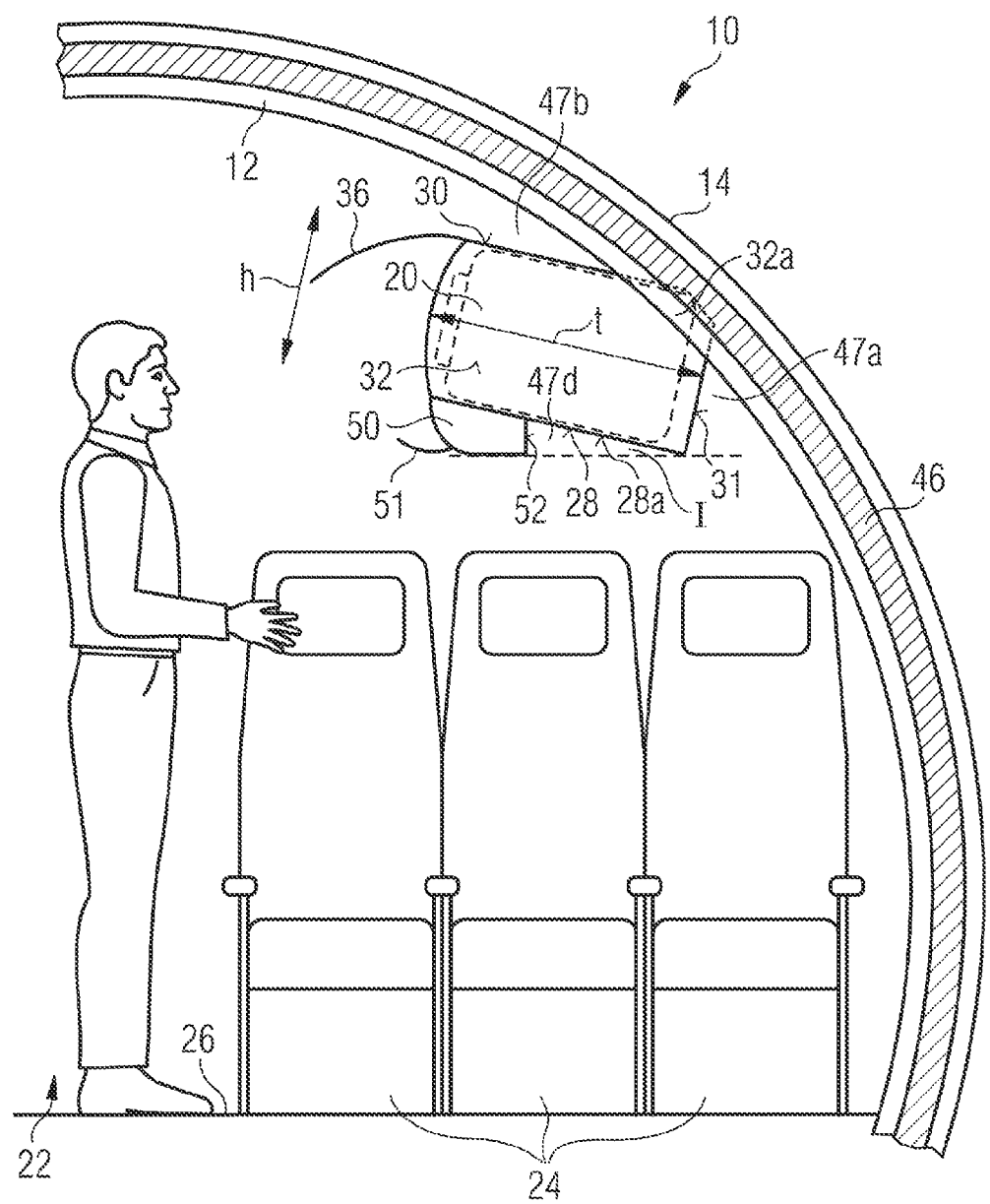
FIG. 6 shows a further alternative embodiment of an aircraft area formed by a portion of an aircraft passenger cabin, in a cross sectional view perpendicular to a floor of the aircraft area.

The further embodiment of an aircraft area 10 that is illustrated in FIG. 6 differs from the arrangement according to FIG. 5 in that a first additional luggage compartment 50 is secured to the lower side 28 of the luggage compartment 20. The first additional luggage compartment 50 is an additional luggage compartment of small volume which may be utilized, for example, for accommodating small articles. As an alternative to this, it is conceivable to utilize the first additional luggage compartment 50 not for purposes of storing baggage but to mount in the first additional luggage compartment 50 components that are to be mounted in the region of the lower side 28 of the luggage compartment 20, for example, PSU components. Moreover, a grip rail that extends along the longitudinal axis L of the aircraft area 10 may be formed integral with the first additional luggage compartment 50.

The first additional luggage compartment 50 includes a hinged flap 51 which is pivotal between a closed position and an open position and which, similarly to the hinged flap 36 of the luggage compartment 20, has a convex curvature as seen from an interior of the aircraft area 10. In FIG. 6, both the hinged flap 36 of the luggage compartment 20 and the hinged flap 51 of the first additional luggage compartment 50 are shown in their open position. From this illustration, it is clear that the hinged flap 36 of the luggage compartment 20 is pivotal into its open position in the direction of the ceiling region of the aircraft area 10, whereas the hinged flap 51 of the first additional luggage compartment 50 is pivotal into its open position in the direction of the floor region of the aircraft area 10.

As well as the regions 47a, 47b, 47c, in the luggage compartment arrangement according to FIG. 6 a region 47d which is delimited by a rear side 52 of the first additional luggage compartment 50 that faces the outer contour of the aircraft area 10, a portion 28a of the luggage compartment lower side 28, and a notional line I that is parallel to the floor 26 of the aircraft area 10 may be utilized as a further installation area for components to be mounted in the aircraft area 10. These components may be, for example, PSU components. Otherwise, the structure of the aircraft area 10 according to FIG. 6 corresponds to the structure of the arrangement according to FIG. 5.

Figure 7:
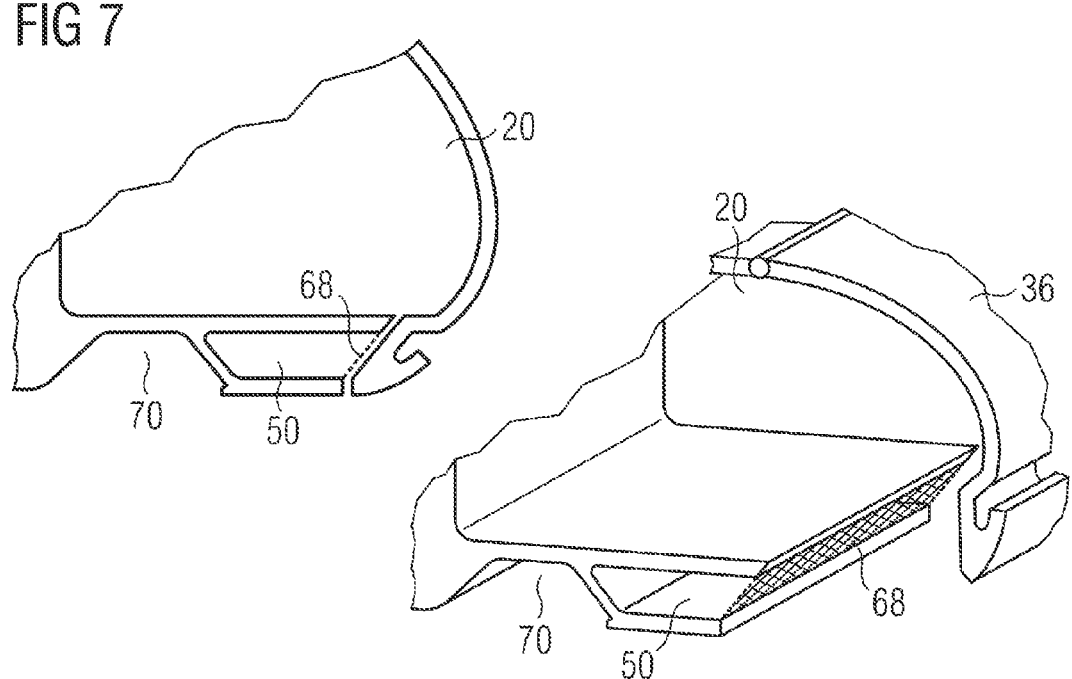
FIG. 7 shows an alternative luggage compartment arrangement suitable for installation in the aircraft area of FIG. 6.

FIG. 7 illustrates an alternative luggage compartment arrangement suitable for installation in the aircraft area 10 according to FIG. 6. The luggage compartment arrangement shown in FIG. 7 differs from the arrangement of FIG. 6 in that the luggage compartment 20 and the first additional luggage compartment 50 have a common hinged flap 36 that is pivotal between a closed position and an open position so that the luggage compartment 20 and the first additional luggage compartment 50 may be closed and opened at the same time by pivoting the hinged flap 36. An access opening 66 of the additional luggage compartment 50 is covered by a mesh 68. The mesh 68 prevents items received within the additional luggage compartment 50 from falling out of the additional luggage compartment 50 when the luggage compartment 20 and the additional luggage compartment 50 are opened, but still is transparent enough to allow a user seeing the interior of the additional luggage compartment 50 and identifying items stored therein. Otherwise, the structure of the luggage compartment arrangement according to FIG. 7 corresponds to the structure of the arrangement shown in FIG. 6.

Figure 8:
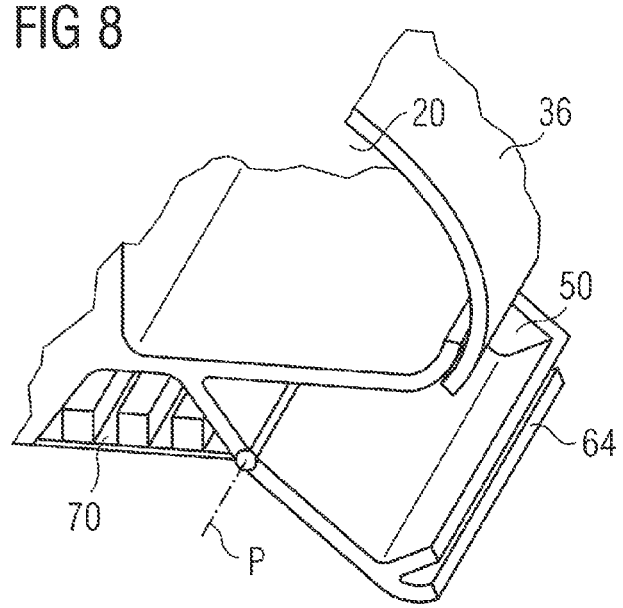
FIG. 8 shows a further alternative luggage compartment arrangement suitable for installation in the aircraft area of FIG. 6.

FIG. 8 illustrates a further alternative luggage compartment arrangement suitable for installation in the aircraft area 10 according to FIG. 6. The luggage compartment arrangement shown in FIG. 8 differs from the arrangement of FIG. 6 in that the additional luggage compartment 50 comprises a shell 64 that is pivotable relative to the luggage compartment 20 between a closed position and an open position about a pivot axis P. Since the additional luggage compartment 50 is arranged adjacent to the lower side 28 of the luggage compartment 20, the shell 64 of the additional luggage compartment 50 may be lowered relative to the luggage compartment 20 in order to open the additional luggage compartment 50. In the luggage compartment arrangement according to FIG. 8, the pivot axis P about which the shell 64 of the additional luggage compartment 50 is pivotable relative to the luggage compartment 20 extends substantially parallel to the longitudinal axis L of the aircraft area 10. The additional luggage compartment 50 thus is easily accessible for a person standing in an aisle of the aircraft area 10 adjacent to the additional luggage compartment 50. Otherwise, the structure of the luggage compartment arrangement according to FIG. 8 corresponds to the structure of the arrangement shown in FIG. 6.

Figure 9:
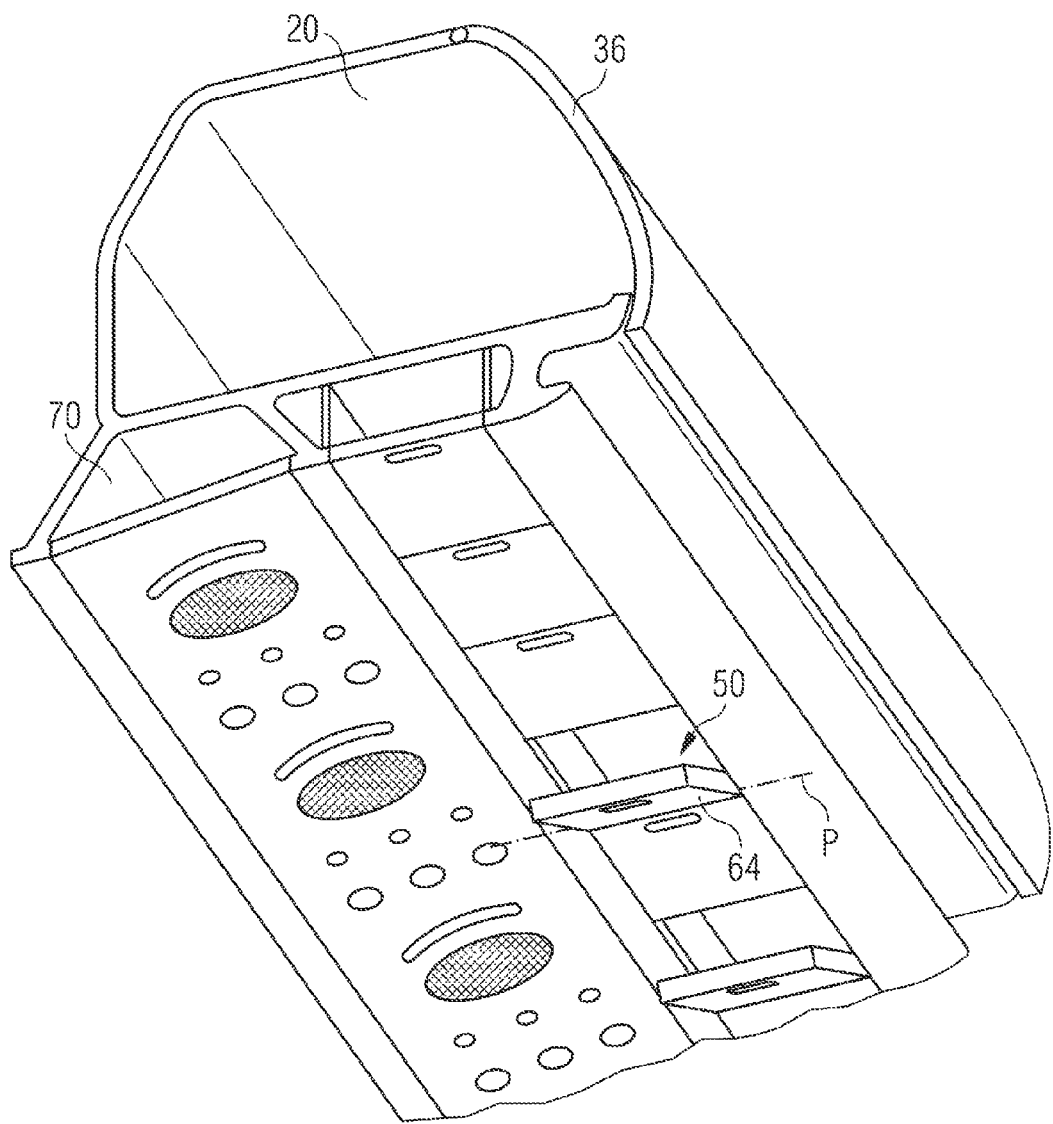
FIG. 9 shows a further alternative luggage compartment arrangement suitable for installation in the aircraft area of FIG. 6.

In the luggage compartment arrangement depicted in FIG. 9, the additional luggage compartment 50 is designed and arranged such that its shell 64 is pivotable relative to the luggage compartment 20 about a pivot axis P which extends substantially perpendicular to the longitudinal axis L of the aircraft area 10. The additional luggage compartment 50 is positioned beside a PSU channel 72 above rows of passenger seats. As a result, the additional luggage compartment 50 is easily accessible to passengers sitting on the passenger seats. Otherwise, the structure of the luggage compartment arrangement according to FIG. 9 corresponds to the structure of the arrangement shown in FIG. 8.

Figure 10:
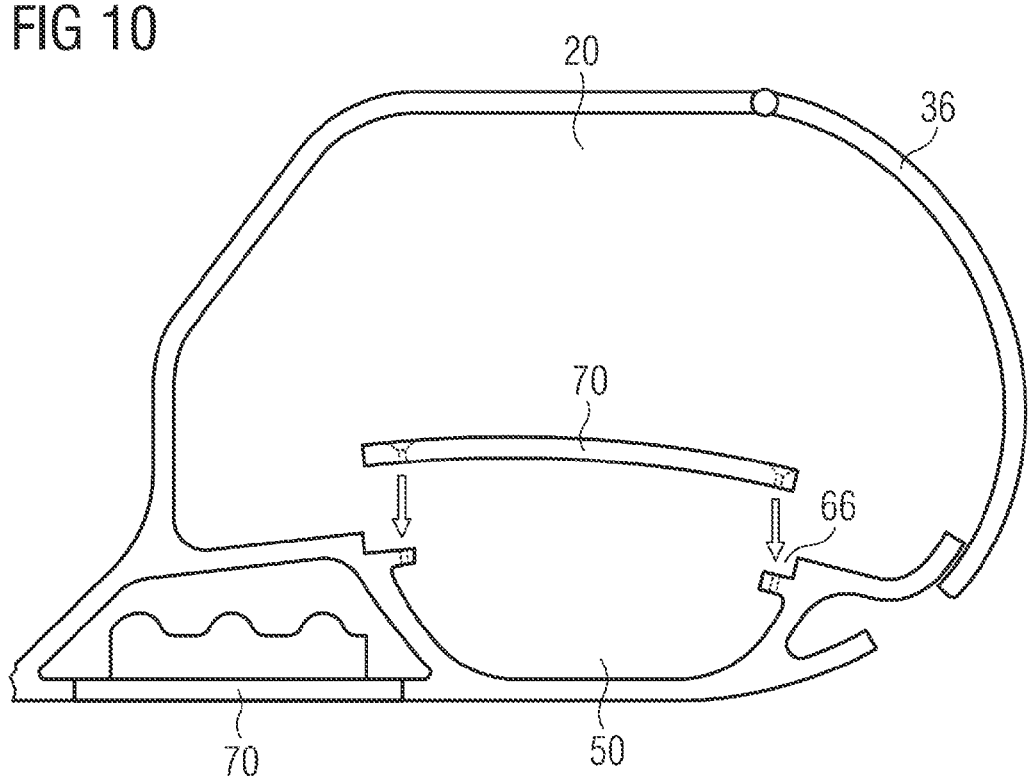
FIG. 10 shows a further alternative luggage compartment arrangement suitable for installation in the aircraft area of FIG. 6.

FIG. 10 illustrates a further alternative luggage compartment arrangement suitable for installation in the aircraft area 10 according to FIG. 6. In the luggage compartment arrangement according to FIG. 10, an access opening 66 of the additional luggage compartment 50 is formed in the lower side 28 of the luggage compartment 20. Hence, the additional luggage compartment 50 is accessible via an interior of the luggage compartment 20 and may be used to receive components to be mounted in the overhead region of the aircraft region 10 such as, for example, PSU components or system interfaces. The access opening 66 is covered by a detachable cover 70 which protects components mounted within the additional luggage compartment 50 from external influences, but still allows easy access to the components, if needed, for example, for maintenance purposes. Otherwise, the structure of the luggage compartment arrangement according to FIG. 9 corresponds to the structure of the arrangement shown in FIG. 6.

Figure 11:
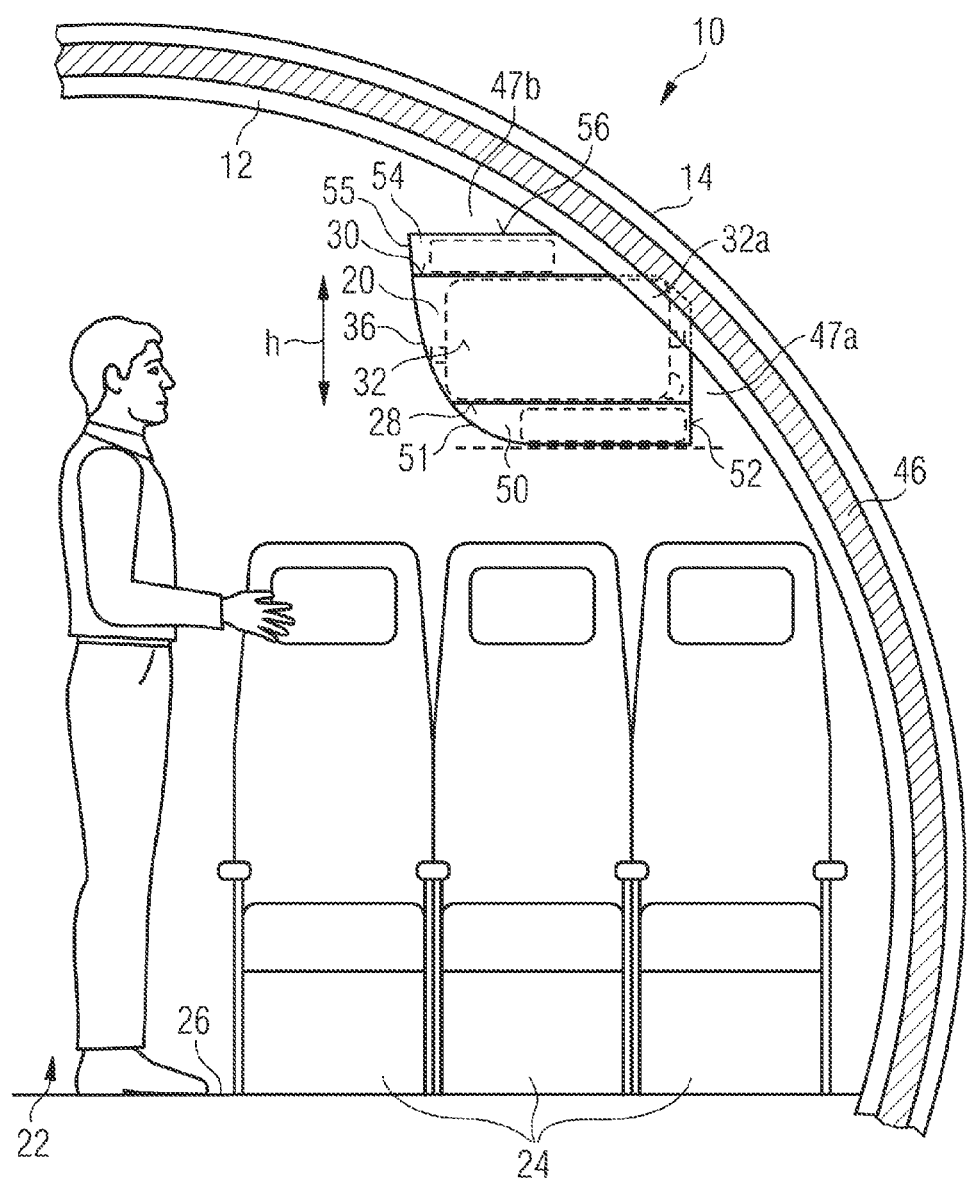
FIG. 11 shows a further alternative embodiment of an aircraft area formed by a portion of an aircraft passenger cabin, in a cross sectional view perpendicular to a floor of the aircraft area.

The embodiment of an aircraft area 10 that is shown in FIG. 11 differs from the arrangement according to FIGS. 1 to 3 in that, as well as the luggage compartment 20, a first additional luggage compartment 50 that is secured to the lower side 28 of the luggage compartment 20 and a second additional luggage compartment 54 that is secured to the upper side 30 of the luggage compartment 20 are present in the aircraft area 10. The two additional luggage compartments 50, 54 are each shaped and dimensioned such that they are capable of accommodating flat articles. The additional luggage compartments 50, 54 may, for example, be utilized to stow a briefcase or articles of clothing. A region 47b which lies between an upper side 56 of the second additional luggage compartment 54 and the outer contour of the aircraft area 10 and is available as an installation area for components to be built into the aircraft area 10 is smaller than the corresponding region 47b in the arrangement according to FIGS. 1 to 3, in which the region 47b is delimited by the upper side 30 of the luggage compartment 20 and the outer contour of the aircraft area 10. Moreover, the first additional luggage compartment 50 reduces the headroom for passengers seated on the passenger seats 24 to a greater extent than in the arrangement according to FIG. 6. Otherwise, the structure of the aircraft area 10 according to FIG. 11 corresponds to the structure of the arrangement shown in FIGS. 1 to 3.

Figure 12:
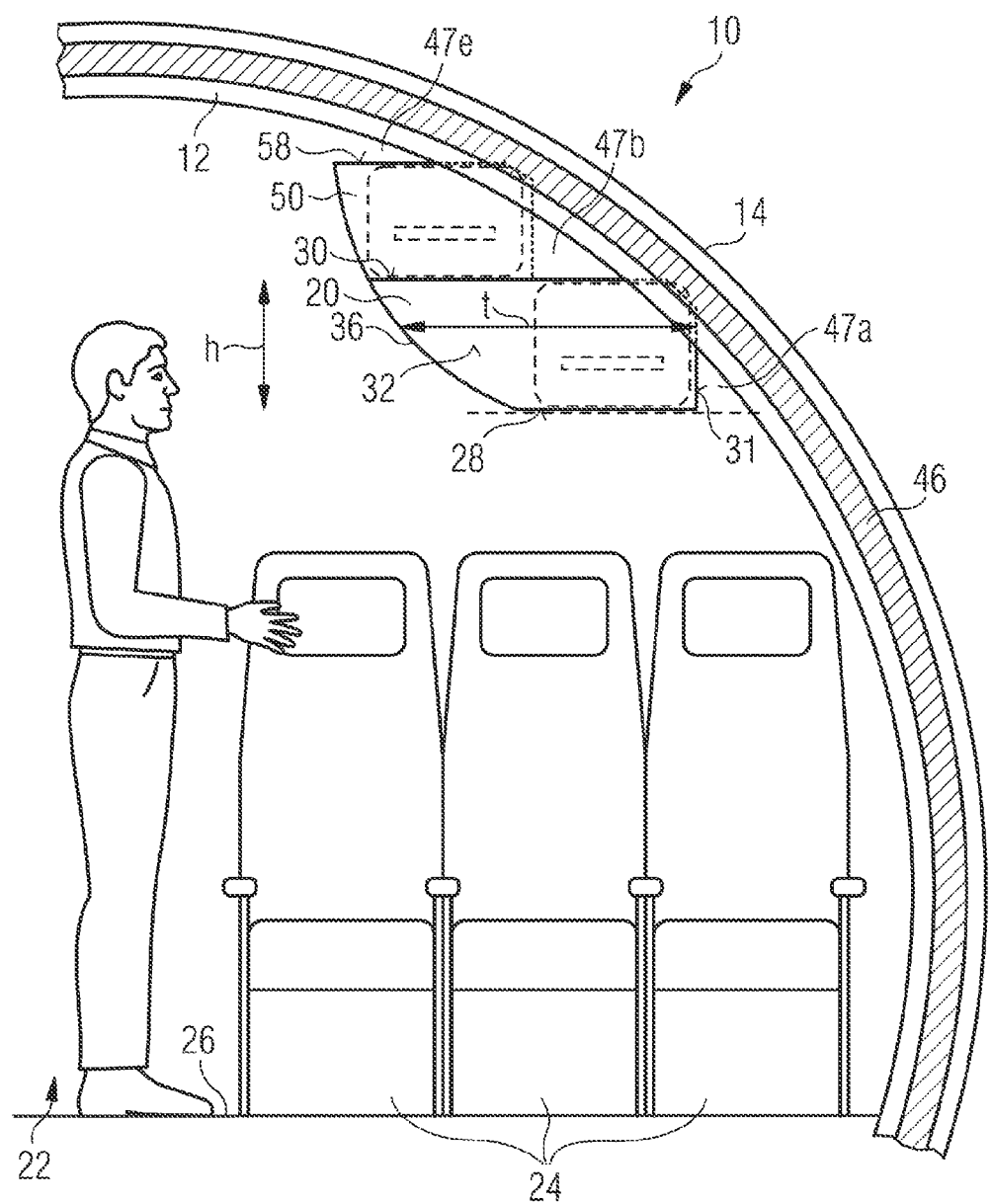
FIG. 12 shows a further alternative embodiment of an aircraft area formed by a portion of an aircraft passenger cabin, in a cross sectional view perpendicular to a floor of the aircraft area.

Finally, FIG. 12 illustrates a further embodiment of an aircraft area 10, which differs from the arrangement according to FIGS. 1 to 3 in that, as well as the luggage compartment 20, a first additional luggage compartment 50 that is secured to the upper side 30 of the luggage compartment 20 and is consequently arranged in the direction of the ceiling region of the aircraft area 10, above the luggage compartment 20, is provided. The first additional luggage compartment 50 is a luggage compartment that is of comparable dimensions to the luggage compartment 20, that is to say, the first additional luggage compartment 50, like the luggage compartment 20, is suitable for accommodating standard items of baggage and has all the features described above in connection with the first luggage compartment 20 as regards its arrangement with respect to the ribs 12, 16.

The luggage compartment 20 and the first additional luggage compartment 50 have a common hinged flap 36 that is pivotal between a closed position and an open position. By pivoting the hinged flap 36, the luggage compartment 20 and the first additional luggage compartment 50 may be closed and opened at the same time. In this case, the curvature of the hinged flap 36 is adapted to the arrangement and shape of the luggage compartment 20 and the first additional luggage compartment 50 such that the baggage-accommodating capacity of the luggage compartment 20 and the first additional luggage compartment 50 are restricted as little as possible, but in the ceiling region of the aircraft area 10 there is still the impression of a generous provision of space. Moreover, the luggage compartment 20 and the first additional luggage compartment 50 are positioned in the aircraft area 10 such that the headroom of passengers seated on the passenger seats 24 is not unduly restricted.

In the aircraft area 10 according to FIG. 12, as well as the region 47a and the region 47b, a region 47e which is delimited by an upper side 58 of the first additional luggage compartment 50 and the outer contour of the aircraft area 10 is available as an installation space for components that are to be built into the aircraft area 10. Otherwise, the structure of the aircraft area 10 according to FIG. 12 corresponds to the structure of the arrangement according to FIGS. 1 to 3.

Figure 13:
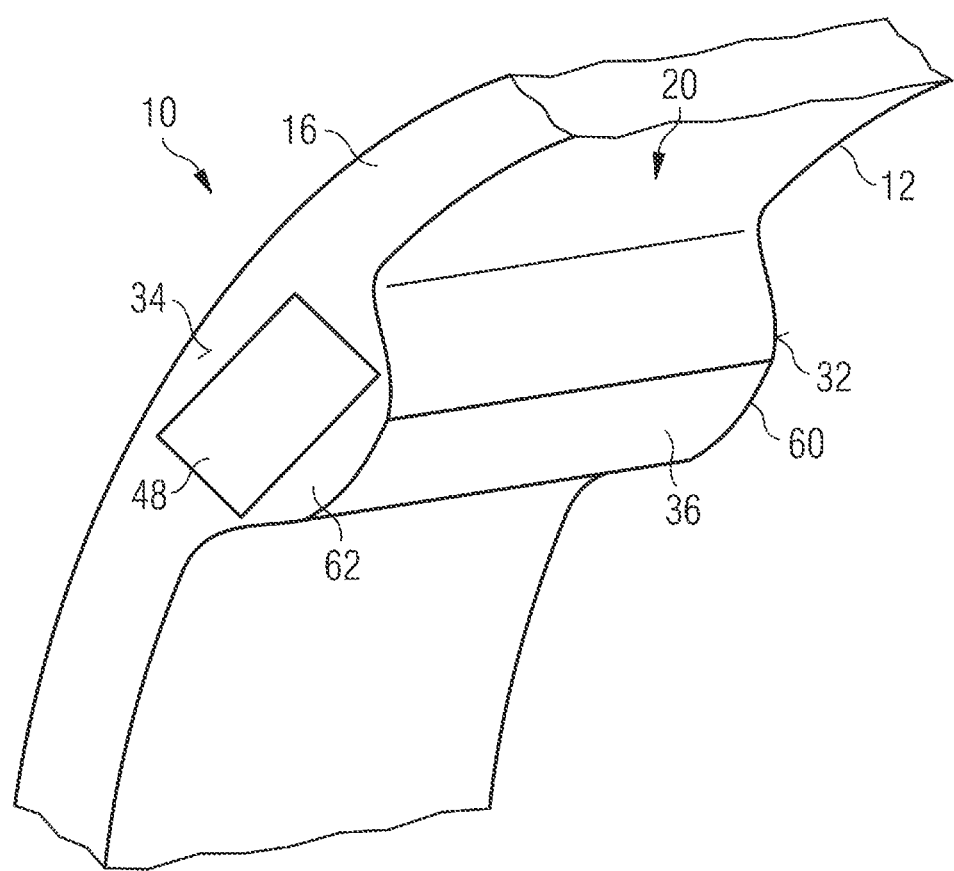
FIG. 13 shows yet a further embodiment of an aircraft area in a schematic three-dimensional illustration.

The aircraft area 10 shown in FIG. 13 differs from the arrangement according to FIGS. 1 to 3 in that the side faces 32, 34 of the luggage compartment 20 are no longer formed separately from the ribs 12, 16 of the aircraft primary structure. Instead, the first side face 32 of the luggage compartment 20 is formed integral with the first rib 12, while the second side face 34 of the luggage compartment 20 is formed integral with the second rib 16. In particular, the first side face 32 of the luggage compartment 20 is formed by a region 60 of the first rib 12 that is widened in the direction of the interior of the aircraft area 10, whereas the second side face 34 of the luggage compartment 20 is formed by a region 62 of the second rib 16 that is widened in the direction of the interior of the aircraft area 10. An integrated design of the luggage compartment side faces 32, 34 with the ribs 12, 16 is particularly useful if the ribs 12, 16 are made from a composite material, in particular a fiber-reinforced composite material. Otherwise, the structure of the aircraft area according to FIG. 13 corresponds to the structure of the arrangement according to FIGS. 1 to 3.

Although specific features of the invention have been described here in conjunction with specific embodiments of the invention, these features may be combined with one another in any desired way. In particular, features that have been described in conjunction with a specific embodiment of an aircraft area 10 may be combined with one another in any desired way.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft area comprising:
a first rib which forms a component of an aircraft primary structure and extends in the shape of an arc along an outer contour of the aircraft area,
a second rib which is arranged at a distance from the first rib and parallel to the first rib and which also forms a component of the aircraft primary structure and extends in the shape of an arc along the outer contour of the aircraft area, and
a luggage compartment which is arranged between the first and the second rib such that at least one of:
a portion of a first side face of the luggage compartment that faces the first rib is arranged opposite a side face of the first rib that faces the luggage compartment, and
a portion of a second side face of the luggage compartment that faces the second rib is arranged opposite a side face of the second rib that faces the luggage compartment;
a portion of at least one of
the first side face of the luggage compartment that faces the first rib, or
the second side face of the luggage compartment that faces the second rib, projects in the direction of the outer contour of the aircraft area, beyond the side face of the first rib or second rib that faces the luggage compartment.

2. The aircraft area according to claim 1, wherein the portion of the first side face of the luggage compartment which is arranged opposite the side face of the first rib that faces the luggage compartment extends substantially parallel to the side face of the first rib that faces the luggage compartment.

3. The aircraft area according to claim 1, wherein the portion of the second side face of the luggage compartment that is arranged opposite the side face of the second rib that faces the luggage compartment extends substantially parallel to the side face of the second rib that faces the luggage compartment.

4. The aircraft area according to claim 1, wherein a rear side of the luggage compartment has a shape adapted to the outer contour of the aircraft area.

5. The aircraft area according to claim 1, wherein the rear side of the luggage compartment comprises a first and a second portion, the first portion extending in particular substantially perpendicular to at least one of a lower side of the luggage compartment that faces a floor region of the aircraft area and an upper side of the luggage compartment that faces a ceiling region of the aircraft area, and the second portion preferably being inclined relative to the first portion.

6. The aircraft area of claim 5, wherein the second portion of the rear side of the luggage compartment is inclined at an angle of 120 to 160° relative to the first portion.

7. The aircraft area according to claim 1, wherein the luggage compartment is positioned such that at least one of the lower side and the upper side of the luggage compartment is inclined at an angle of 4 to 15° relative to a floor of the aircraft area, in the direction of the outer contour of the aircraft area.

8. The aircraft area according to claim 1, wherein the luggage compartment includes a hinged flap which is pivotal between a closed position and an open position and which, as seen from an interior of the aircraft area, has a convex or concave curvature.

9. The aircraft area according to claim 1, wherein at least one of:
the distance between the first and the second rib,
a maximum dimension of the luggage compartment along a longitudinal axis of the aircraft area,
a maximum dimension of the luggage compartment between the lower side and the upper side of the luggage compartment, or
a maximum dimension of the luggage compartment between the rear side and the pivotal hinged flap of the luggage compartment,
is selected such that the luggage compartment can accommodate a desired number of standard items of baggage in a desired orientation.

10. The aircraft area according to claim 1, wherein the portion of the first side face of the luggage compartment that is arranged opposite the side face of the first rib abuts against a first primary insulation element that at least partly encases the first rib, wherein the portion of the second side face of the luggage compartment that is arranged opposite the side face of the second rib abuts against a second primary insulation element that at least partly encases the second rib, and wherein the rear side of the luggage compartment abuts against a third primary insulation element which preferably extends at least in certain regions along the outer contour of the aircraft area.

11. The aircraft area according to claim 10, wherein the second portion of the rear side of the luggage compartment abuts against the third primary insulation element.

12. The aircraft area according to claim 1, wherein the first side face of the luggage compartment is formed integral with the first rib.

13. The aircraft area according to claim 1, wherein the second side face of the luggage compartment is formed integral with the second rib.

14. The aircraft area according to claim 1, wherein the first side face of the luggage compartment is formed by a region of the first rib that is widened in the direction of the interior of the aircraft area.

15. The aircraft area according to claim 1, wherein the second side face of the luggage compartment is formed by a region of the second rib that is widened in the direction of the interior of the aircraft area.

16. The aircraft area according to claim 1, wherein the aircraft area further includes at least one additional luggage compartment which is arranged adjacent to at least one of the upper side and the lower side of the luggage compartment.

17. The aircraft area according to claim 16, wherein the additional luggage compartment comprises a shell that is pivotable relative to the luggage compartment between a closed position and an open position about a pivot axis, wherein the pivot axis extends one of substantially parallel and substantially perpendicular to the longitudinal axis of the aircraft.

18. The aircraft area according to claim 16, wherein an access opening of the additional luggage compartment is covered by a mesh.

19. The aircraft area according to claim 16, wherein the luggage compartment and the additional luggage compartment have a common hinged flap that is pivotal between a closed position and an open position.

20. The aircraft area according to claim 16, wherein an access opening of the additional luggage compartment is formed in the lower side of the luggage compartment that faces a floor region of the aircraft area.

21. The aircraft area according to claim 20, wherein the access opening is covered by a detachable cover.

* * * * *